United States Patent
Pauly et al.

(10) Patent No.: US 7,294,840 B2
(45) Date of Patent: Nov. 13, 2007

(54) APPARATUS AND METHOD FOR REDUCING MICROPHONIC SUSCEPTIBILITY IN A RADIATION DETECTOR

(75) Inventors: Steven W. Pauly, Knoxville, TN (US); Michael S. Blair, Knoxville, TN (US); Mark Holdaway, Clinton, TN (US)

(73) Assignee: Nucsafe, Inc., Oak Ridge, TN (US)

( * ) Notice: Subject to any disclaimer, the term of this patent is extended or adjusted under 35 U.S.C. 154(b) by 0 days.

(21) Appl. No.: 11/365,098

(22) Filed: Mar. 1, 2006

(65) Prior Publication Data

US 2007/0205372 A1    Sep. 6, 2007

(51) Int. Cl.
G01T 3/00    (2006.01)
(52) U.S. Cl. .................................. 250/390.01
(58) Field of Classification Search ........... 250/390.01, 250/336.1, 252.1
See application file for complete search history.

(56) References Cited

U.S. PATENT DOCUMENTS

| 4,580,057 | A |   | 4/1986 | Sidhwa |
| 4,879,463 | A | * | 11/1989 | Wraight et al. ........... 250/269.2 |
| 4,920,548 | A | * | 4/1990 | Gaussa et al. ............... 376/255 |
| 5,023,450 | A | * | 6/1991 | Gold ........................... 250/261 |
| 5,307,299 | A |   | 4/1994 | Stein et al. |
| 5,821,533 | A |   | 10/1998 | Bingham et al. |
| 5,873,054 | A | * | 2/1999 | Warburton et al. ......... 702/190 |
| 6,347,288 | B1 |  | 2/2002 | Trammell et al. |
| 6,388,260 | B1 | * | 5/2002 | Doty et al. ............ 250/390.01 |
| 7,142,625 | B2 | * | 11/2006 | Jones et al. ................. 376/153 |
| 2005/0135534 | A1 |  | 6/2005 | Jones et al. |

* cited by examiner

Primary Examiner—David Porta
Assistant Examiner—Mark R Gaworecki
(74) Attorney, Agent, or Firm—Luedeka, Neely & Graham, P.C.

(57) ABSTRACT

The invention provides a system for removing or minimizing microphonic noise from a radiation detector signal, such as from a neutron detector, without creating excessive false counts in the electronics that count the radiation events. The system solves the microphonic noise problem using a 3-prong approach: (1) maintaining high dynamic range by avoiding large amplification and the possibility of saturation in the analog stages, (2) sampling the amplified analog signal using a high-resolution analog-to-digital converter (ADC), and (3) implementing a digital filtering algorithm that rejects the noise due to microphonics while passing the signal of interest from the neutron interactions.

18 Claims, 6 Drawing Sheets

APPARATUS AND METHOD FOR REDUCING MICROPHONIC SUSCEPTIBILITY IN A RADIATION DETECTOR

The present invention was developed at least in part with funding received from the Defense Threat Reduction Agency under contract number HDTRA1-04-C-0008. The U.S. government may have certain rights in this invention.

FIELD

This invention relates generally to reducing noise in electronic systems. More particularly, this invention relates to reducing microphonic noise in a radiation detection system.

BACKGROUND

Neutron radiation detectors are used in sensing neutrons emanating from a radiation source. Typically, neutrons are only emitted from a very limited set of man-made materials. This makes neutron detectors useful in detecting the presence of such made-made sources of neutron radiation, such as are typically present within radiological materials.

A general example of a Helium-3 ($^3$He) neutron detector is shown in FIG. 1. The detector includes a metal tube filled with $^3$He gas under high pressure, such as 3 or more atmospheres. Centrally located within the metal tube is a wire electrode which is biased by an external high voltage supply coupled through a resistor (R). The high voltage is typically is on the order of +1200 V with respect to the metal tube housing of the detector which is held at ground potential. The signal generated by the detector when neutrons interact with the $^3$He gas is coupled by a capacitor (C) to a charge sensitive preamplifier that provides an amplified voltage pulse to downstream electronic circuits that count the number of neutron interactions that have occurred within the detector.

The voltage pulse at the output of the preamplifier typically has a rise time less than 2 microseconds and a fall time constant (also referred to as tail recovery time) on the order of 10 or more microseconds. The rise time is usually dictated by the bandwidth and slew rate of the preamplifier components, the capacitance of the interconnections between the detector and the preamplifier, and the nuclear collection characteristics of the detector. The tail pulse decay time constant is determined by an RC time constant within the preamplifier (not shown in FIG. 1).

The voltage pulses at the output of the preamplifier are further processed to enable counting of the neutron interaction events, and in some instances to measure the pulse amplitudes. The typical use of this type of detector is in counting the number of events larger than some noise threshold, thereby allowing measurement of the neutron flux in counts per second.

When a detector like that shown in FIG. 1 is subjected to vibration, the internal wire electrode will move with respect to the outer metal casing. This movement of the internal electrode, which is at the high electrical potential, with respect to the outer metal casing, which is at the ground electrical potential, injects charge into the preamplifier. This injected charge, referred to herein as microphonic noise, is amplified by the preamplifier in the same fashion as normal signals from the detector. The microphonic noise will appear as voltage waveforms at the preamplifier output. The presence of such noise can cause the output of the preamplifier to saturate and/or increase the difficulty in accurately detecting the real neutron interaction events in the subsequent processing stages.

Prior neutron detection systems have attempted to amplify the detector signal as high as possible and then process the preamplifier waveform using a simple comparator. This approach causes the preamplifier or subsequent amplifier stages to saturate, thereby rendering them "blind" to subsequent pulses from the detector. If the microphonic noise is not of sufficient amplitude to totally saturate the preamplifier or subsequent amplifiers, it can still cause the comparator which follows to fire repeatedly as the microphonic noise crosses the set threshold. This causes bursts of false neutron counts as the microphonic noise continues. In some prior systems, attempts have been made to detect either of these conditions and turn off the reporting of any events when these conditions occur. Other systems have tried to detect the microphonic vibrations with accelerometers or other means to initiate algorithms to blank out the response of the systems to the microphonic noise.

It is conceivable that these weaknesses in prior detector systems could be purposefully exploited to allow illicit neutron-emitting sources to pass by undetected. In this respect, microphonic noise is analogous to a "jamming" signal in a communication or radar application. Preventing these radiation detectors from being "jammed" is one of the purposes of the present invention.

What is needed, therefore, is a system for removing or minimizing microphonic noise from a radiation detector signal without creating excessive false counts in the electronics that count the radiation events.

SUMMARY

According to the invention, the approach taken to solve the microphonic noise problem is three-fold: (1) maintain high dynamic range by avoiding large amplification and the possibility of saturation in the analog stages, (2) sample the analog signal using a high-resolution analog-to-digital converter (ADC), and (3) implement a digital filtering algorithm that rejects the noise due to microphonics while passing the signal of interest from the neutron interactions.

Following this preferred approach, the analog preamplifier stage of the preferred embodiment does not amplify signals from the detector to voltage levels close to amplifier saturation point. This provides high dynamic range so that the preamplifier does not saturate when microphonic noise is present. Saturation of the preamplifier or any subsequent electronic circuit, including the ADC, generally results in irrecoverable loss of information. In the preferred embodiment of the invention, this is avoided by using lower gain in the preamplifier and not using additional stages of amplification.

The preamplifier is followed by a sampling ADC having sufficient dynamic range to allow conversion of low level pulses from the preamplifier in the presence of larger microphonic noise waveforms. In the preferred embodiment, the ADC has a 14-bit resolution and samples the analog waveform from the preamplifier at a 30 MHz rate. The combination of oversampling (sampling much faster than the frequency of the signal of interest) and high resolution provides a useable dynamic range for recovering the real neutron interaction signal, even when it is nearly swamped out by microphonic noise.

Finally, the data from the ADC is processed by a field programmable gate array (FPGA) that implements a digital signal processing filter for rejecting the microphonic noise while still accepting the signal of interest.

According to the preferred embodiment of the invention, all three of these aspects are addressed in rejecting the microphonic noise. While it is possible to sample the analog waveform with a lower resolution ADC, saturating the preamplifier or the ADC still should be avoided, and the digital algorithm is still necessary to recover the real signal from the noise. Although there are tradeoffs to be considered in the selection of the ADC, in general, more bits of resolution in the ADC will allow lower gain in the preamplifier and slower sampling rates.

The electrical filtering approach taken in the present invention has been demonstrated to work so well that mechanical damping devices have become unnecessary in neutron detector systems, even those subjected to significant levels of microphonic noise. This has resulted in significant cost reductions for neutron detector systems that employ the invention.

According to one preferred embodiment, the invention provides an apparatus for detecting a pulse signal associated with a radiation event in the presence of microphonic noise. The apparatus includes a radiation detector, a preamplifier circuit, an analog-to-digital converter and a digital filter circuit. The radiation detector generates a detector signal, where the detector signal comprises the pulse signal associated with the radiation event and a noise signal associated with the microphonic noise. The preamplifier circuit amplifies the detector signal to an amplified level that is below a saturation level of the preamplifier circuit. The analog-to-digital conversion circuit converts the amplified detector signal to a digital signal. The digital filter circuit digitally filters out the noise signal from the digital signal, thereby providing a digitally filtered pulse signal.

According to another embodiment, the invention provides an apparatus for detecting a pulse signal associated with a neutron radiation event in the presence of microphonic noise. In this embodiment, the apparatus includes a helium-3 neutron detector which generates a detector signal, where the detector signal comprises the pulse signal associated with the neutron radiation event and a noise signal associated with the microphonic noise. The apparatus also includes a preamplifier circuit that amplifies the detector signal to an amplified level which is below a saturation level of the preamplifier circuit. The apparatus further includes an analog-to-digital conversion circuit that converts the amplified detector signal to a digital signal.

A digital filter circuit of this embodiment digitally filters out the noise signal from the digital signal, thereby providing a digitally filtered pulse signal. The digital filter circuit of this embodiment includes a fast shaping filter, a timing logic circuit, a slow shaping filter and a peak detector circuit. The fast shaping filter filters out the noise signal from the digital signal to produce an event signal. The timing logic circuit receives the event signal from the fast shaping filter and generates a filter reset signal and a sample signal based at least in part on the event signal. The slow shaping filter receives the digital signal and the filter reset signal, and recovers a shaped pulse signal from the digital signal based at least in part on timing provided by the filter reset signal. The peak detector circuit receives the shaped pulse signal and the sample signal, detects a peak level of the shaped pulse signal based at least in part on timing provided by the sample signal, and generates a peak value indicative of the peak level.

This embodiment of the invention also includes a processor electrically connected to the peak detector circuit. The processor receives a plurality of peak values that are indicative of peak levels of a plurality of detected pulses, and generates a histogram of the peak levels of the detected pulses over a period of time.

In another aspect, the invention provides an apparatus for detecting a pulse signal associated with a radiation event in the presence of microphonic noise. In this embodiment, the apparatus includes means for detecting the radiation event and for generating an analog detector signal, where the analog detector signal comprises the pulse signal associated with the radiation event and a noise signal associated with the microphonic noise. The apparatus also includes means for amplifying the analog detector signal to an amplified level which is below a saturation level. The apparatus includes means for converting the amplified analog detector signal to a digital signal, and means for digitally filtering out the noise signal from the digital signal, thereby providing a digitally filtered pulse signal.

BRIEF DESCRIPTION OF THE DRAWINGS

Further advantages of the invention are apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
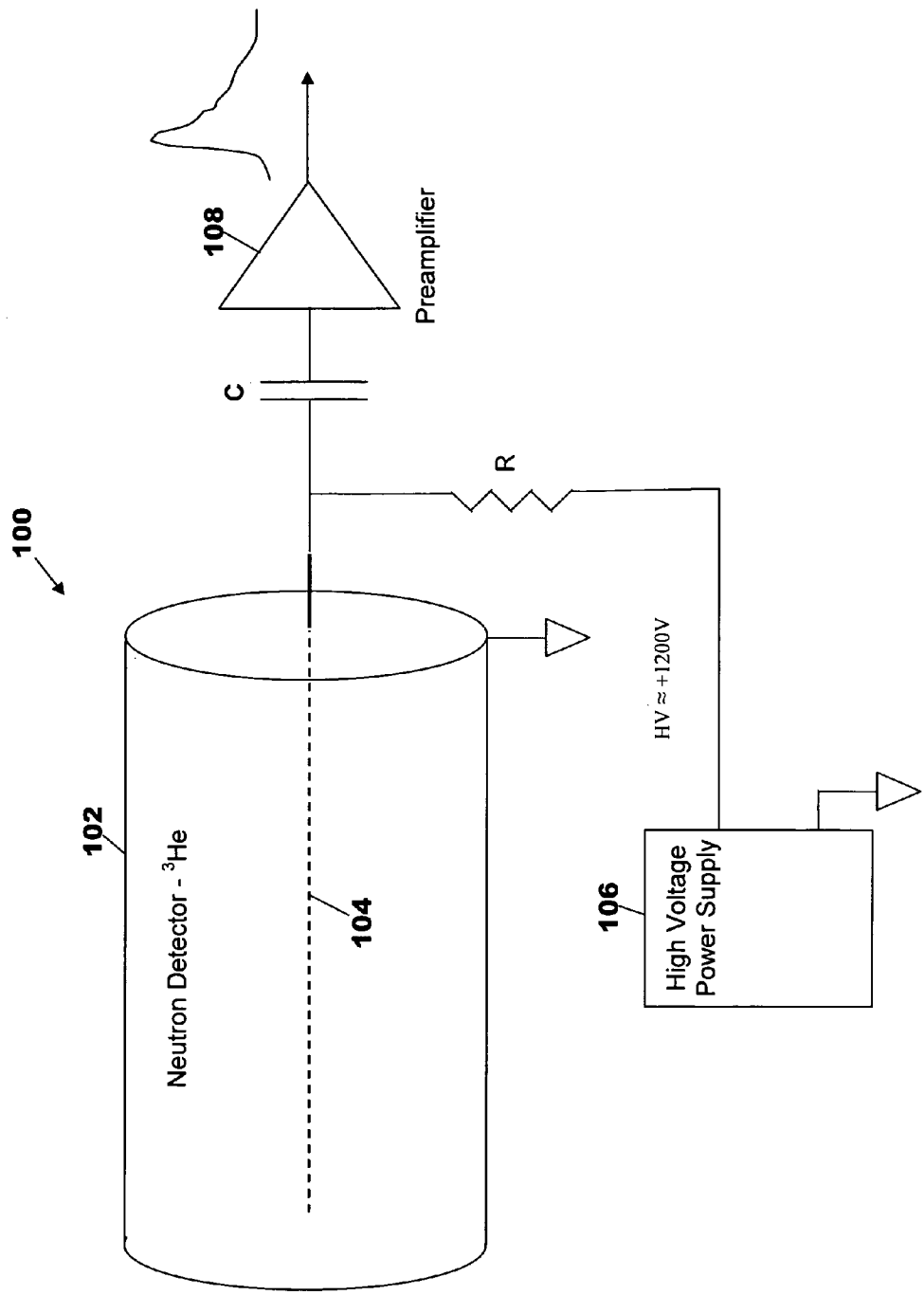
FIG. 1 depicts a schematic diagram of a Helium-3 neutron detector.
Figure 2:
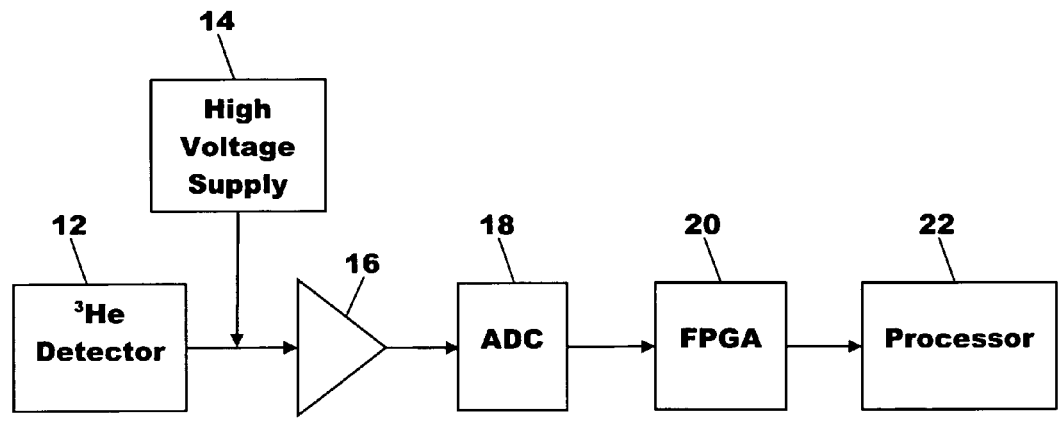
FIG. 2 depicts a schematic block diagram of a neutron detector unit according to a preferred embodiment of the invention.

A schematic block diagram of a preferred embodiment of the invention is depicted in FIG. 2. As shown in FIG. 2, the preferred embodiment includes a helium-3 detector 12, a high voltage power supply 14, a preamplifier 16, an ADC 18, a FPGA 20 and a processor 22.

The preamplifier 16 is preferably a transimpedance operational amplifier having an FET input with RC feedback components of R=10 MΩ and C=1 pF, which yields a time constant of about 10 microseconds. Typical pulses at the output of the preamplifier 16 have amplitudes of approximately 50 mV. The preamplifier 16 preferably uses a single-sided supply voltage of 3 V and is biased so that when no pulses are present the output level is 1.5 V. In other words, when pulses are present, they are superimposed on a 1.5 V offset. In the preferred embodiment of the invention, the gain of the preamplifier is set to no more than about 1 volt/picocoulomb (1 V/pC), thereby amplifying the pulse/noise signal from the detector to a level that is well below the saturation point of the preamplifier.

The ADC 18 of the preferred embodiment is a 14-bit ADC with a differential input. The negative differential input is biased at 1.5 V so that the ADC 18 removes the 1.5 V bias applied by the preamplifier 16. This biasing approach allows a single supply architecture for the analog components which simplifies the physical implementation. The output of the ADC 18 is preferably a 2's complement pulse train.

The ADC output is provided to the FPGA 20 which applies a digital filtering algorithm for removal of the microphonic noise. The filtering algorithm is discussed in more detail below. The FPGA 20 also generates a count of the radiation event pulses which is provided to the processor 22.

The processor 22 further processes the count rate information and provides it in a form that can be monitored by a remote processor (not shown in FIG. 2). The processor 22 can implement ROI counters, histogram memory, and provide additional filtering of the count rate data. The processor 22 also can implement diagnostic algorithms and monitor state of health of the system. In this embodiment, the processor 22 also provides control of the high voltage bias on the detector 12 as well as reports if the high voltage bias deviates from the desired set value. The processor 22 also controls the detection threshold parameter and boundaries for the ROI counter 32. These parameters are user settable.

Figure 4:
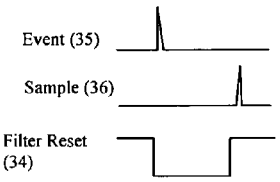
FIG. 4 depicts a timing diagram according to a preferred embodiment of the invention.
Figure 3:
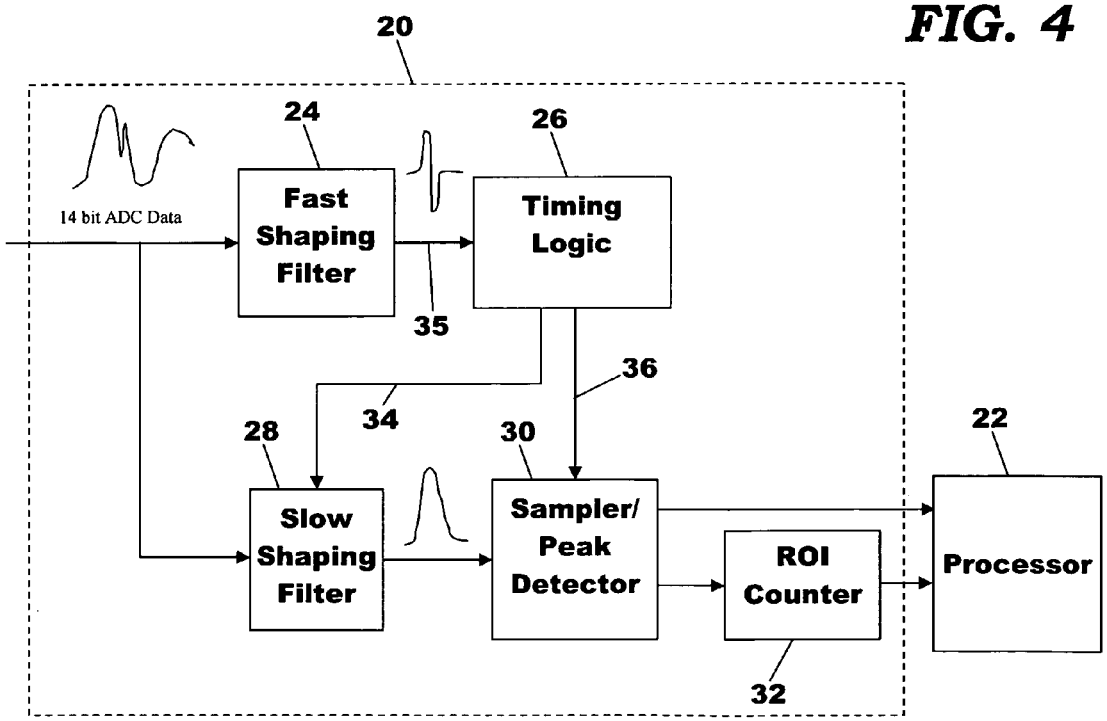
FIG. 3 depicts a schematic block diagram of a fast shaping filter and timing logic portion of a neutron detector unit according to a preferred embodiment of the invention.

According to the preferred embodiment of the invention, the FPGA 20 applies a digital signal processing algorithm that includes several stages. As shown in FIG. 3, one stage utilizes a Fast Shaping Filter 24 and Timing Logic 26 to detect neutron events. The Timing Logic 26 holds a Slow Shaping Filter 28 in a reset condition by application of a reset signal on a filter reset line 34. As shown in the timing diagram of FIG. 4, the Timing Logic 26 removes the filter reset when the Fast Shaping Filter 24 detects an event. The Slow Shaping Filter 28 provides a more accurate filter for allowing the amplitude of the incoming pulse to be accurately peak detected and sampled in a sampler/peak detector circuit 30.

In one embodiment, the amplitude data is compiled into a histogram by the processor 22. In addition or alternatively, the amplitude data is provided to a Region Of Interest (ROI) window comparator 32. The comparator 32 increments a counter when the detected pulse lies within a desired ROI.

Figure 5:
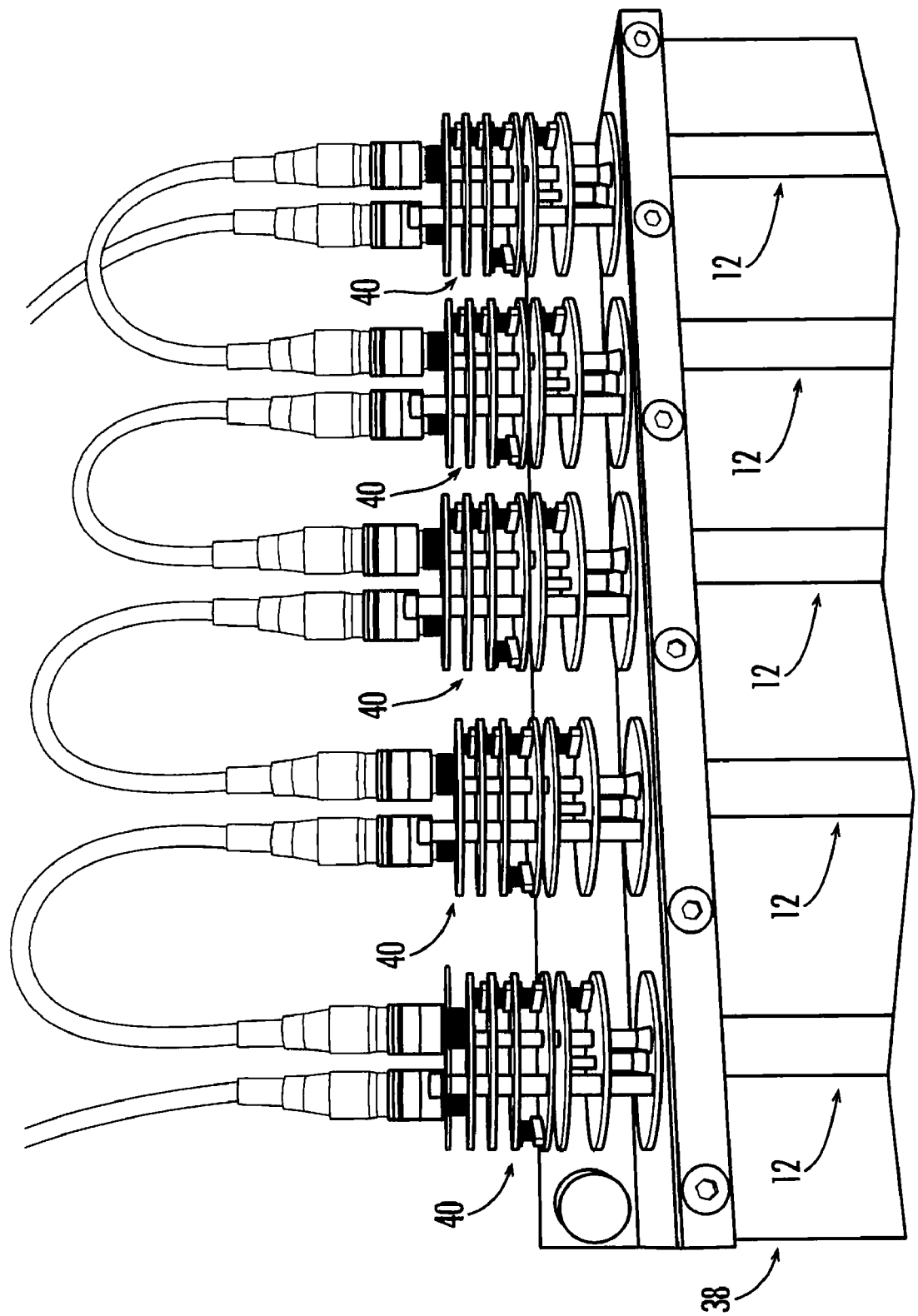
FIG. 5 depicts a physical implementation of components of a neutron detector unit according to a preferred embodiment of the invention.

FIG. 5 depicts a preferred embodiment of a physical implementation of the invention. This embodiment comprises five "stacks" of six circuit boards 40 each. The preamplifiers 16, ADCs 18 and FPGAs 20 are implemented in the circuit boards 40. This implementation allows the electronics to fit conveniently behind (or above) the detectors 12 which are surrounded by white plastic neutron moderator material 38.

Figure 6:
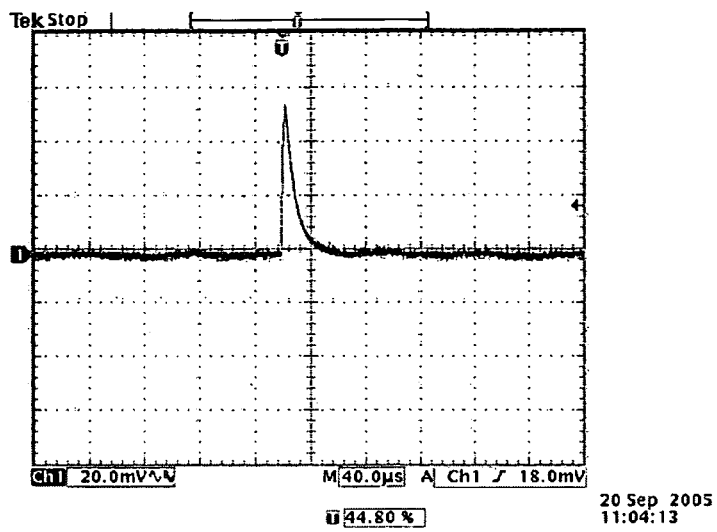
FIG. 6 depicts an oscilloscope screen display of a detected pulse indicating a neutron event.
Figure 7:
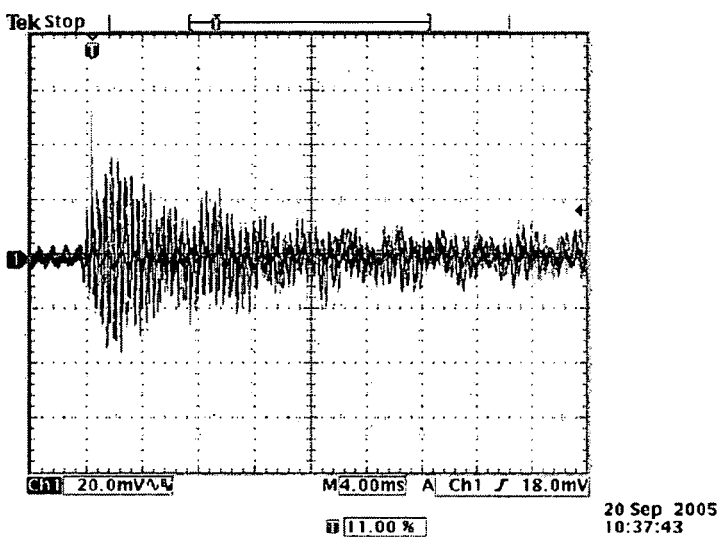
FIG. 7 depicts an oscilloscope screen display showing microphonic noise at a preamplifier output.

FIG. 6 depicts an actual measured neutron event pulse at the output of the preamplifier 16 that was captured by a Tektronix TDS3032B oscilloscope. FIG. 7 depicts an oscilloscope trace of microphonic noise at the preamplifier output when the detector 12 is subjected to microphonic vibration. In this example, the noise amplitude is slightly lower than the pulse amplitude shown in FIG. 6. However, it should be appreciated that many neutron pulses are smaller in amplitude than the one shown in FIG. 6, and the amplitude of the microphonic noise can be much larger than that shown in FIG. 7. When exposed to the level of vibration-induced noise depicted in FIG. 7, a typical prior art comparator, such as used to detect a voltage level above a threshold, would be "fooled" into indicating one or more false neutron events.

Figure 8:
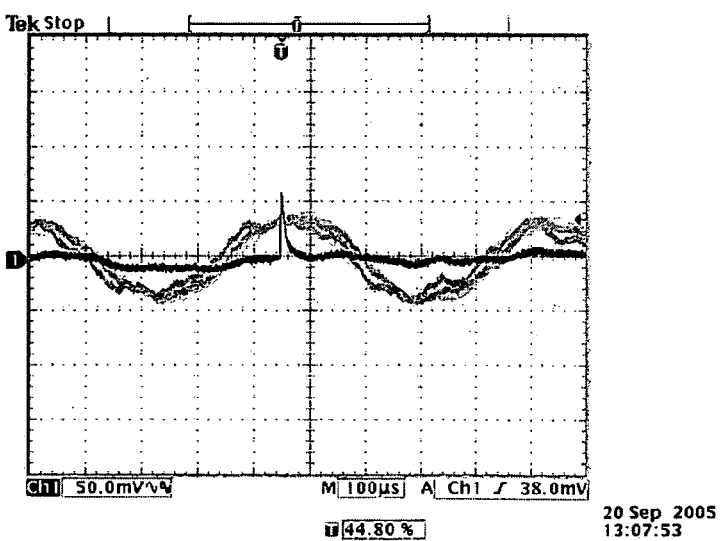
FIG. 8 depicts an oscilloscope screen display showing a detected pulse and microphonic noise superimposed on the same time scale.

FIG. 8 depicts a real detected pulse at the output of the preamplifier 16 along with microphonic noise superimposed on the same time scale. This illustrates a major difference between the noise and the real signal of interest. The real signals from neutron interactions are significantly faster in rise time than the noise induced by microphonic vibrations.

Figure 9:
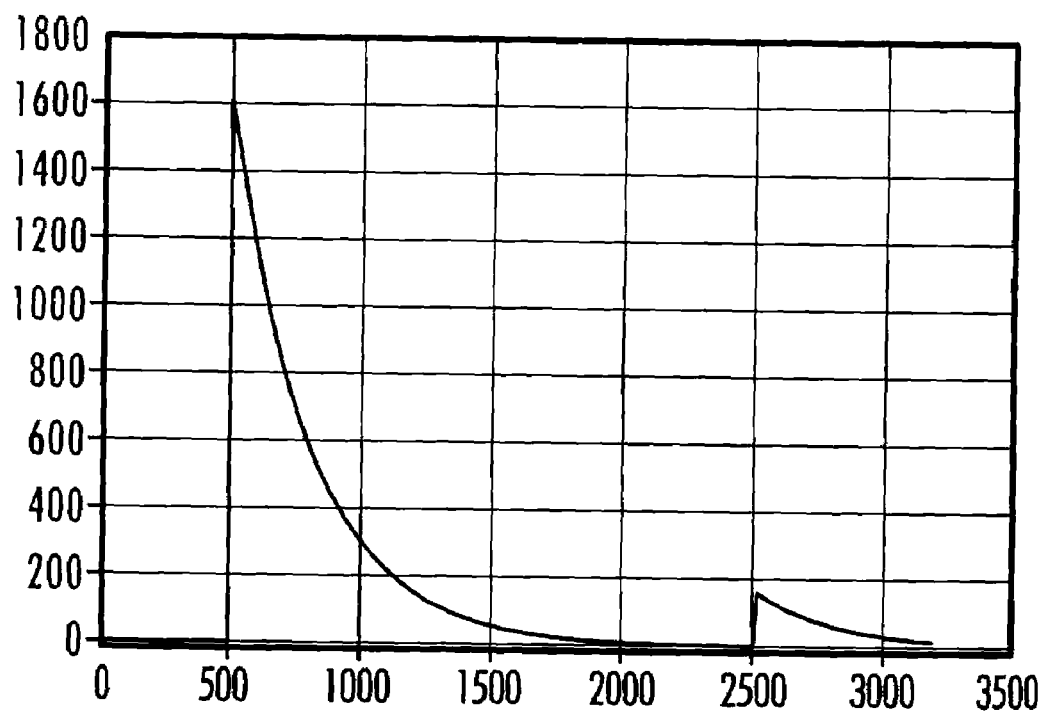
FIG. 9 depicts a graphic representation of two ideal pulses produced by a mathematical simulation.

Development of the present invention was aided by the use of simulation algorithms (such as provided by Matlab and Simulink software). In particular, such algorithms were used to evaluate the outcome when noise is injected onto the real pulse signal of interest. One example of a simulated ideal signal is shown in FIG. 9. This simulated signal comprises a 50 mV neutron pulse with a rise time of 260 nanoseconds and a 20 mV neutron pulse with a rise time of 2 microseconds as digitized by a 14 bit ADC. A tail pulse decay time constant of 10 microsecond was used for both pulses.

Figure 10:
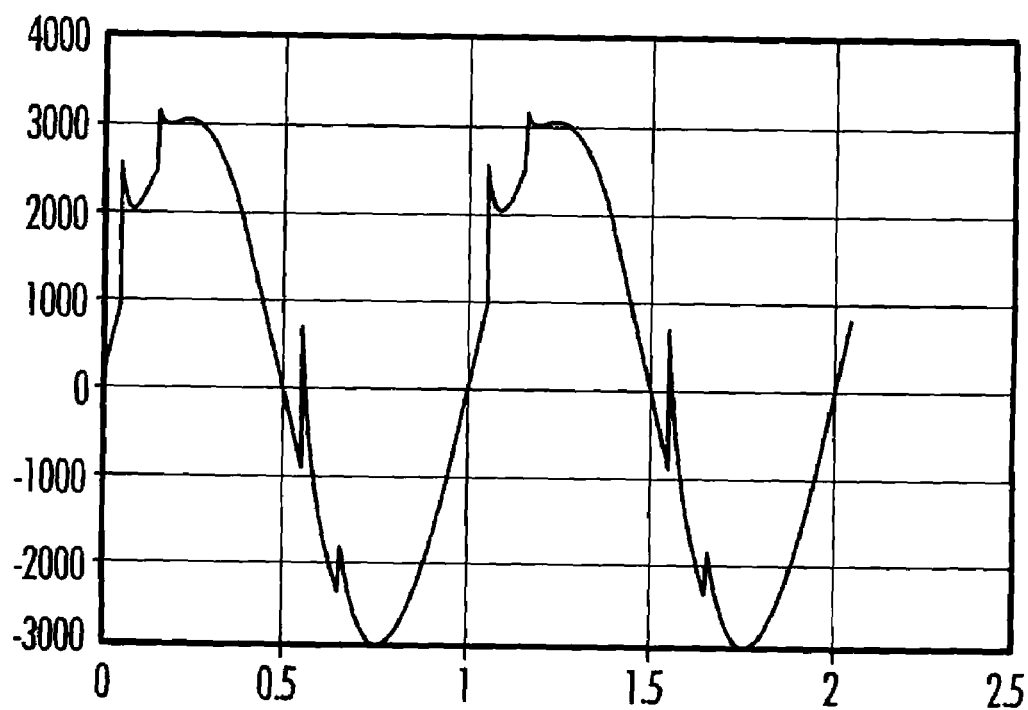
FIG. 10 depicts a graphic representation of the two ideal pulses of FIG. 9 superimposed on a sinusoidal noise waveform.
Figure 11:
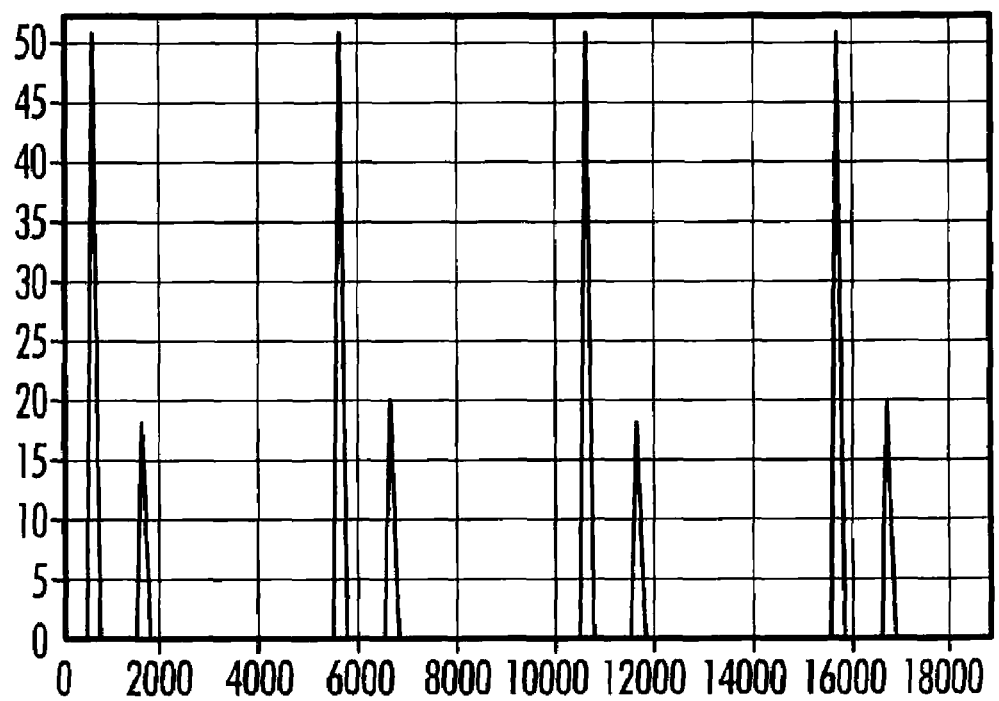
FIGS. 11 and 12 depict graphic representations of the ideal pulses after digital filtration according to a preferred embodiment of the invention.

FIG. 10 shows the same simulated signals superimposed on a sinusoidal signal representative of microphonic noise. FIG. 11 shows the result after the preferred embodiment of the digital filter acts upon the signals shown in FIG. 10.

Figure 12:
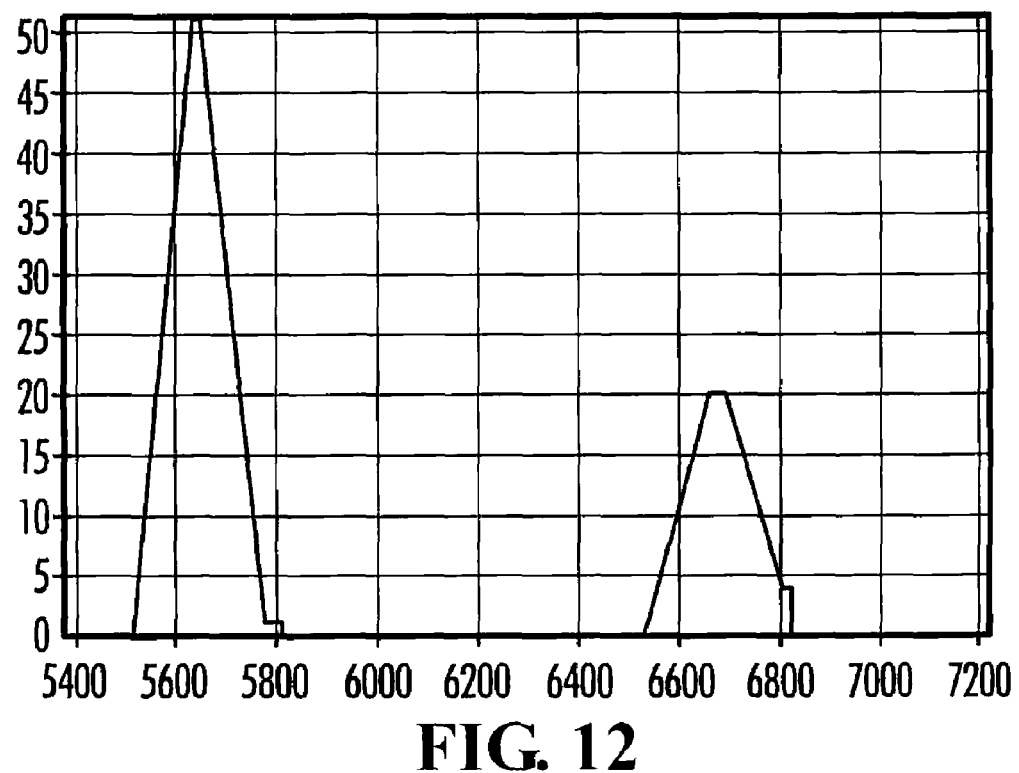

FIG. 12 depicts a zoomed-in view of the simulated signals after processing by the digital filter. It should be noted that the signal amplitudes are nearly constant in spite of having been superimposed on a microphonic noise sinusoidal signal of much larger amplitude. As shown in FIG. 12, the amplitudes of the filtered pulsed are approximately 50 for the 50 mV pulse and 20 for the 20 mV pulse, which corresponds to the actual amplitudes of the input pulses. These simulated signals demonstrate how the invention successfully detects neutron pulses as real events without being "jammed" or "blanked out" because of the large microphonic noise source. Thus, the present invention reduces the susceptibility of neutron detectors to microphonic noise that may be coupled into the detectors from sources such as passing locomotives and truck engines.

In an alternative embodiment of the invention, the output 35 of the fast shaping filter 24 (rather than the slow shaping filter 28) is provided directly to the input of the sampler/peak detector 30. (See FIG. 3.) In this embodiment, the sampler/peak detector 30 detects neutron events for purposes of counting as in the embodiment described previously. However, lacking the adjustment of peak amplitude provided by the slow shaping filter, the amplitude of the peak pulse detected by the sampler/peak detector 30 is not necessarily representative of the actual amplitude of the detected pulse. Thus, although this embodiment is useful for event counting, it is not as useful in producing pulses of the correct amplitude as is necessary for amplitude histogram processing.

Although the preferred embodiment of the invention described herein has been particularly useful in eliminating noise in neutron detectors, such as $^3$He detectors, it should be appreciated that the invention is not limited to neutron detection systems. Other types of radiation sensors can benefit from the invention as well. For example, multi-channel analyzers (MCAs) are now commercially available that provide amplitude histograms for gamma ray detectors such as HPGe and NaI(Th). However, the problem of removing noise that is as large or larger than the signal of interest has not been addressed in such digital MCAs. Although some of these MCAs have been optimized for HPGe used with electromechanical coolers, these systems usually do not encounter noise signals larger than the signal of interest. In applications where microphonic noise induced by the electromechanical cooler is a problem, only mechanical means have been applied in reducing the vibrations. It is anticipated that the present invention may have some benefit or applicability to these and other detector types, since many of these detectors also suffer degradation in the presence of strong microphonic noise.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An apparatus for detecting a pulse signal associated with a neutron radiation event in the presence of microphonic noise, the apparatus comprising:
   a neutron detector for generating a detector signal, the detector signal comprising the pulse signal associated with the neutron radiation event and a noise signal associated with the microphonic noise;
   a preamplifier circuit for receiving the detector signal and amplifying the detector signal to an amplified level which is below a saturation level of the preamplifier circuit;
   an analog-to-digital conversion circuit for receiving the amplified detector signal and converting the amplified detector signal to a digital signal;
   a digital filter circuit for receiving the digital signal and digitally filtering out the noise signal, thereby providing a digitally filtered pulse signal.

2. The apparatus of claim 1 wherein the neutron detector further comprises a helium-3 neutron detector for generating the detector signal associated with the neutron radiation event.

3. The apparatus of claim 1 wherein the digital filter circuit comprises a field programmable gate array.

4. The apparatus of claim 1 wherein the digital filter circuit comprises a fast shaping filter for filtering out the noise signal from the digital signal to produce an event signal.

5. The apparatus of claim 4 wherein the digital filter circuit further comprises:
   a timing logic circuit for receiving the event signal from the fast shaping filter and for generating a filter reset signal and a sample signal based at least in part on the event signal;
   a slow shaping filter for receiving the digital signal and the filter reset signal, and for recovering a shaped pulse signal from the digital signal based at least in part on timing provided by the filter reset signal; and
   a peak detector circuit for receiving the shaped pulse signal and the sample signal, for detecting a peak level of the shaped pulse signal based at least in part on timing provided by the sample signal, and for generating a peak value indicative of the peak level.

6. The apparatus of claim 5 wherein the slow shaping filter recovers the shaped pulse signal having an amplitude that is substantially the same as the amplitude of the pulse signal absent the noise signal.

7. The apparatus of claim 5 further comprising a processor for receiving a plurality of peak values from the peak detector circuit, the peak values indicative of peak levels of a plurality of detected pulses, the processor further for generating a histogram of the peak levels of the detected pulses over a period of time.

8. The apparatus of claim 5 further comprising a region of interest window comparator for receiving a plurality of peak values from the peak detector circuit, the peak values indicative of peak levels of a plurality of detected pulses, the region of interest window comparator for incrementing a counter when the peak values fall within a desired region of interest window.

9. An apparatus for detecting a pulse signal associated with a neutron radiation event in the presence of microphonic noise, the apparatus comprising:
   a helium-3 neutron detector for generating a detector signal, the detector signal comprising the pulse signal associated with the neutron radiation event and a noise signal associated with the microphonic noise;
   a preamplifier circuit for receiving the detector signal and amplifying the detector signal to an amplified level which is below a saturation level of the preamplifier circuit;
   an analog-to-digital conversion circuit for receiving the amplified detector signal and converting the amplified detector signal to a digital signal;
   a digital filter circuit for receiving the digital signal and digitally filtering out the noise signal, thereby providing a digitally filtered pulse signal, the digital filter circuit comprising:
      a fast shaping filter for filtering out the noise signal from the digital signal to produce an event signal;
      a timing logic circuit for receiving the event signal from the fast shaping filter and for generating a filter reset signal and a sample signal based at least in part on the event signal;
      a slow shaping filter for receiving the digital signal and the filter reset signal, and for recovering a shaped pulse signal from the digital signal based at least in part on timing provided by the filter reset signal; and
      a peak detector circuit for receiving the shaped pulse signal and the sample signal, for detecting a peak level of the shaped pulse signal based at least in part on timing provided by the sample signal, and for generating a peak value indicative of the peak level; and
   a processor for receiving a plurality of peak values from the peak detector circuit, the peak values indicative of peak levels of a plurality of detected pulses, the processor further for generating a histogram of the peak levels of the detected pulses over a period of time.

10. The apparatus of claim 9 further comprising a region of interest window comparator for receiving the plurality of peak values from the peak detector circuit and for incrementing a counter when the peak values fall within a desired region of interest window.

11. The apparatus of claim 9 wherein the slow shaping filter recovers the shaped pulse signal having an amplitude that is substantially the same as the amplitude of the pulse signal absent the noise signal.

12. The apparatus of claim 9 wherein the digital filter circuit comprises a field programmable gate array.

13. An apparatus for detecting a pulse signal associated with a neutron radiation event in the presence of microphonic noise, the apparatus comprising:
- means for detecting the neutron radiation event and for generating an analog detector signal, the analog detector signal comprising the pulse signal associated with the neutron radiation event and a noise signal associated with the microphonic noise;
- means for receiving the analog detector signal and amplifying the analog detector signal to an amplified level which is below a saturation level;
- means for receiving the analog detector signal that is amplified to the amplified level and for converting the amplified analog detector signal to a digital signal;
- means for receiving the digital signal and digitally filtering out the noise signal, thereby providing a digitally filtered pulse signal.

14. The apparatus of claim 13 wherein the means for detecting the neutron radiation event comprises a helium-3 neutron detector for generating the analog detector signal associated with the neutron radiation event.

15. The apparatus of claim 13 wherein the means for receiving the digital signal and digitally filtering out the noise signal comprises a field programmable gate array.

16. The apparatus of claim 13 wherein the means for receiving the digital signal and digitally filtering out the noise signal comprises fast shaping filter means for filtering out the noise signal from the digital signal to produce an event signal.

17. The apparatus of claim 16 wherein the means for receiving the digital signal and digitally filtering out the noise signal further comprises:
- timing logic means for receiving the event signal from the fast shaping filter means and for generating a filter reset signal and a sample signal based at least in part on the event signal;
- slow shaping filter means for receiving the digital signal and the filter reset signal, and for recovering a shaped pulse signal from the digital signal based at least in part on timing provided by the filter reset signal; and
- peak detector means for receiving the shaped pulse signal and the sample signal, for detecting a peak level of the shaped pulse signal based at least in part on timing provided by the sample signal, and for generating a peak value indicative of the peak level.

18. A method for detecting a pulse signal associated with a neutron radiation event in the presence of microphonic noise, the method comprising:
- (a) detecting the neutron radiation event and generating an analog detector signal, the analog detector signal comprising the pulse signal associated with the neutron radiation event and a noise signal associated with the microphonic noise;
- (b) receiving the analog detector signal and amplifying the analog detector signal to an amplified level which is below a saturation level;
- (c) receiving the analog detector signal that is amplified to the amplified level and converting the amplified analog detector signal to a digital signal; and
- (d) receiving the digital signal and digitally filtering out the noise signal, thereby providing a digitally filtered pulse signal.

* * * * *